(12) United States Patent
Hong et al.

(10) Patent No.: US 10,922,718 B2
(45) Date of Patent: Feb. 16, 2021

(54) SYSTEM FOR CONTENT RECOMMENDATION SERVICE, CONTENT RECOMMENDATION DEVICE AND METHOD OF OPERATING THE SAME

(71) Applicant: SK PLANET CO., LTD., Gyeonggi-do (KR)

(72) Inventors: Gum Won Hong, Gyeonggi-do (KR); Nam Hee Kang, Seoul (KR); Dong Hun Shin, Seoul (KR); Young Sook Hwang, Seoul (KR)

(73) Assignee: SK Planet Co., Ltd., Seongnam-si (KR)

( * ) Notice: Subject to any disclaimer, the term of this patent is extended or adjusted under 35 U.S.C. 154(b) by 728 days.

(21) Appl. No.: 14/969,971

(22) Filed: Dec. 15, 2015

(65) Prior Publication Data

US 2016/0196580 A1 Jul. 7, 2016

(30) Foreign Application Priority Data

Jan. 2, 2015 (KR) ........................ 10-2015-0000255

(51) Int. Cl.
*G06Q 30/02* (2012.01)

(52) U.S. Cl.
CPC ..... *G06Q 30/0255* (2013.01); *G06Q 30/0269* (2013.01)

(58) Field of Classification Search
None
See application file for complete search history.

(56) References Cited

U.S. PATENT DOCUMENTS

| 2010/0312726 A1* | 12/2010 | Thompson | ........... G06K 9/6254 706/12 |
| 2011/0223571 A1* | 9/2011 | Farahat | .................. G06Q 30/02 434/236 |
| 2015/0193539 A1* | 7/2015 | Fechete | ............... G06F 16/9535 707/734 |

OTHER PUBLICATIONS

Kim et al., "Emotional expressions in online user reviews: How they influence consumers' product evaluations," Journal of Business Research 65 (2012) 985-992 (Year: 2012).*

* cited by examiner

*Primary Examiner* — Christopher B Tokarczyk
(74) *Attorney, Agent, or Firm* — Fenwick & West LLP (57) ABSTRACT

Disclosed herein are a system for content recommendation service, a content recommendation device and a method of operating the same. The system can recommend personalized content directly related with a recommendation target, irrespectively of whether the content consumption history of the recommendation target user is sufficient to analyze the purchase/use pattern or whether there are other users having similar purchase/user pattern with the recommendation target user. As a result, the recommendation reliability can be improved.

5 Claims, 3 Drawing Sheets

SYSTEM FOR CONTENT RECOMMENDATION SERVICE, CONTENT RECOMMENDATION DEVICE AND METHOD OF OPERATING THE SAME

CROSS-REFERENCE TO RELATED APPLICATIONS

This application is based upon and claims the benefit of priority from Korean Patent Application No. 10-2015-0000255, filed on Jan. 2, 2015, the entire contents of which are incorporated herein by reference.

TECHNICAL FIELD

The present disclosure relates to a system for content recommendation service. More specifically, the present disclosure relates to a system for content recommendation service capable of improving recommendation reliability by way of recommending a content item directly related with a user (recommendation target user) as personalized content to the user. The present disclosure also relates to a device employed in the system and a method for operating the same.

BACKGROUND

Nowadays, a vast amount and diverse of types of content items are being serviced, and with that come services for recommending content items to users (recommendation target users) based on a variety criteria. One of those services is a personalized recommendation service.

The personalized recommendation service recommends the most appropriate content, i.e., personalized content to a recommendation target user based on the content purchase/use pattern of the recommendation target user.

According to such an existing personalized recommendation service, the content purchase/use pattern is analyzed based on a recommendation target user's history of purchasing or using content items in the past, and other users having similar content purchase/use patterns are searched for and content items that the found users have purchased or used are recommended to the recommendation target user.

That is, the existing personalized recommendation services is based on the idea that users having similar content purchase/use patterns are likely to prefer similar content.

Unfortunately, the idea is lack of direct relationship between a recommendation target user and recommended content, and thus the service is not highly reliable.

In addition, the idea essentially requires a sufficient amount of purchase/use histories so that the recommendation target user's content purchase/use pattern can be analyzed, and requires other users having similar purchase/use patterns with the recommendation target user.

In view of the above, aspects of the present disclosure propose a technique of recommending content directly related with a user (recommendation target user) as personalized content to the recommendation target user, without requiring the above-mentioned preconditions.

SUMMARY

An object of the present disclosure is to provide a technique of recommending content directly related with a user (recommendation target user) as personalized content to the recommendation target user.

According to one embodiment of the present disclosure, provided is a content recommendation device including: a content vector creating unit configured to analyze registered meta information and collected review information of each of multiple content items to create content vectors; a consumption history checking unit configured to check a content consumption history of a recommendation target user; a user vector creating unit configured to create a user vector of the recommendation target user based on the content consumption history of the recommendation target user and a content vector of each of consumption content items belonging to the content consumption history; and a recommendation control unit configured to choose at least one recommended content item from among the multiple content items based on a similarity between the user vector of the recommendation target and the content vector of each of the multiple content items.

The similarity table storing similarities among the content items based on the content vectors of the multiple content items may be created, and the recommendation control unit may search the multiple content items for similar content items based on similarities with the consumption content items by referring to the similarity table, and then choose the recommended content item based on a similarity between the user vector of the recommendation target user and the content vector of each of the similar content items.

The content vector creating unit may extract a topic keyword from meta information of a particular content item among the multiple content items based on several predetermined topic keywords, and extract an emotional keyword from review information of the particular content item based on several predetermined emotional keywords. The content vector creating unit may create a content vector of the particular content item in which keyword weight values based on an extraction result of the topic keyword and an extraction result of the emotional keyword are reflected in the respective topic keywords and emotional keywords.

The content vector of the particular content item may include keyword fields each corresponding to the respective topic keywords and emotional keywords, and each of the keyword fields may include a keyword weight value based on the extraction result of the topic keyword and the extraction result of the emotional keyword with respect to the corresponding topic keyword or the emotional keyword.

The content consumption history of the recommendation target user may include a consumption weight value for each of the consumption content items, and the user vector creating unit may search the content vectors of the multiple content items for the content vectors of the consumption content items, and create the user vector of the recommendation target user by applying the consumption weight values of the consumption content items included in the content consumption history of the recommendation target user to the content vectors of the consumption content items.

The recommendation control unit may choose at least one recommended user from among multiple users based on a similarity between the user vector of the recommendation target user and a user vector of each of the multiple users.

The recommendation control unit may choose a content item that the at least one recommended user has consumed as a recommended content item based on a content consumption history of the at least one recommended user.

The recommendation control unit may apply different recommendation weight values to a first recommended content item and a second recommended content item depending on a category to which the first and second recommended content items belong, and the first recommended content item may be chosen based on a similarity between the user vector of the recommendation target user and a content vector of each of the multiple content items, and the second recommended content item may be a content item that the at least one recommended user has consumed.

The recommendation control unit may apply a higher recommendation weight value to the first recommended content items than the second recommended content items if association between content items is more appropriate than association between users in the category, and the recommendation control unit may apply a higher recommendation weight value to the second recommended content items than the first recommended content items if the association between users is more appropriate than the association between content items in the category.

According to another embodiment of the present disclosure, provided is a method of operating a content recommendation device, the method including: analyzing registered meta information and collected review information of each of multiple content items to create content vectors; checking a content consumption history of a recommendation target user; creating a user vector of the recommendation target user based on the content consumption history of the recommendation target user and a content vector of each of consumption content items belonging to the content consumption history; and choosing at least one recommended content item from among the multiple content items based on a similarity between the user vector of the recommendation target and the content vector of each of the multiple content items.

The method may further include: creating a similarity table storing similarities among the content items based on the content vectors of the multiple content items, and wherein the choosing comprises searching the multiple content items for similar content items based on similarities with the consumption content items by referring to the similarity table, and then choosing the recommended content item based on a similarity between the user vector of the recommendation target user and the content vector of each of the similar content items.

The analyzing may include extracting a topic keyword from meta information of a particular content item among the multiple content items based on several predetermined topic keywords, and extracting an emotional keyword from review information of the particular content item based on several predetermined emotional keywords, and comprises creating a content vector of the particular content item in which keyword weight values based on an extraction result of the topic keyword and an extraction result of the emotional keyword are reflected in the respective topic keywords and emotional keywords.

The content vector of the particular content item may include keyword fields each corresponding to the respective topic keywords and emotional keywords, and each of the keyword fields may include a keyword weight value based on the extraction result of the topic keyword and the extraction result of the emotional keyword with respect to the corresponding topic keyword or the emotional keyword.

The content consumption history of the recommendation target user may include a consumption weight value for each of the consumption content items, and the creating may include searching the content vectors of the multiple content items for the content vectors of the consumption content items, and creating the user vector of the recommendation target user by applying the consumption weight values of the consumption content items included in the content consumption history of the recommendation target user to the content vectors of the consumption content items.

The choosing may include choosing at least one recommended user from among multiple users based on a similarity between the user vector of the recommendation target user and a user vector of each of the multiple users.

The choosing may include choosing a content item that the at least one recommended user has consumed as a recommended content item based on a content consumption history of the at least one recommended user.

The choosing may include applying different recommendation weight values to a first recommended content item and a second recommended content item depending on a category to which the first and second recommended content items belong, and the first recommended content item may be chosen based on a similarity between the user vector of the recommendation target user and a content vector of each of the multiple content items, and the second recommended content item may be a content item that the at least one recommended user has consumed.

The choosing may include applying a higher recommendation weight value to the first recommended content items than the second recommended content items if association between content items is more appropriate than association between users in the category, and the recommendation control unit may apply a higher recommendation weight value to the second recommended content items than the first recommended content items if the association between users is more appropriate than the association between content items in the category.

According to another embodiment of the present disclosure, provided is a system for content recommendation service, the system including: a content recommendation device configured to: analyze registered meta information and collected review information of each of multiple content items to create content vectors; check a content consumption history of a recommendation target user; create a user vector of the recommendation target user based on the content consumption history of the recommendation target user and a content vector of each of consumption content items belonging to the content consumption history; and choose at least one recommended content item from among the multiple content items based on a similarity between the user vector of the recommendation target and the content vector of each of the multiple content items; and a terminal device configured to output information of a recommended content item upon receiving the recommended content item chosen by the content recommendation device in response to a content recommendation event.

According to the system for content recommendation service, the content recommendation device and the method of operating the content recommendation device, recommendation reliability can be improved by way of recommending a content item directly related with a user (recommendation target user) as personalized content to the user.

DETAILED DESCRIPTION

Technical terms used herein are used merely for illustrating specific embodiments, and it is to be noted that they are not intended to limit technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings. Also, when the technical terms used herein are determined to be wrong technical terms which fail to represent the technical spirit disclosed in this specification correctly, the terms are to be replaced by the technical terms which can be accurately understood by the person having ordinary skill in the art. Also, the general terms used in this specification are to be construed as defined in the dictionaries or according to context, and they are not to be construed in an excessively narrow meaning.

Also, the singular representation used in this specification includes plural representations unless it is clearly expressed in the context to the contrary. The terms "include" or "is composed of" in this specification are not to be construed to necessarily include all components and all steps cited in this specification, and it should be construed to exclude some components or some steps or further include additional components and steps.

Also, the terms representing an ordinal number such as first, second, etc. used in this specification can be used to explain various components, however, the components are not to be limited by these terms. These terms are used only for discriminate one component from other components. For example, the first component can be entitled as a second component, and similarly, the second component can be entitled as the first component, without departing from the technical scope of the present invention.

In the following, embodiments disclosed in this specification are to be described in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted. Also, it is to be noted that the appended figures are only for facilitating the technical spirit disclosed in this specification and the technical spirit are not to be construed to be limited by the appended figures.

Hereinafter, an exemplary embodiment of the present disclosure will be described with reference to the accompanying drawings.

Initially, a system for content recommendation service according to an exemplary embodiment of the present disclosure will be described with reference to FIG. 1.

Figure 1:
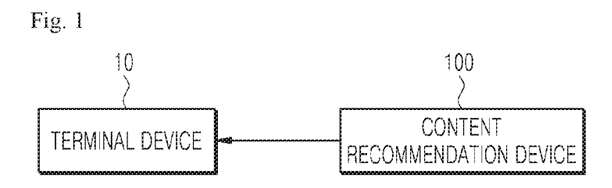
FIG. 1 is a block diagram of a system for content recommendation service according to an exemplary embodiment of the present disclosure.

As shown in FIG. 1, a system for content recommendation service according to the exemplary embodiment includes a terminal device 10 in which a content recommendation event has taken place, and a content recommendation device 100 that recommends personalized content to a user of the terminal device 10, i.e., a recommendation target user.

When a content recommendation event takes place, the terminal device 10 receives personalized content, i.e., recommendation content selected by the content recommendation device 100, and outputs information on the received recommended content, e.g., a recommended content list.

The terminal device 10 may be one of a variety of terminals such as a mobile phone terminal (e.g., a smartphone), a laptop computer, etc.

The content recommendation event may take place under various conditions, such as if a predetermined event period of the terminal device 10 has elapsed, if a content recommendation request is input to the terminal device 10 automatically or manually, or if the terminal device 10 is selected as a content recommendation target user by an external entity, e.g., the content recommendation device 100.

The content recommendation device 100 recommends personalized content to a user of the terminal device 10, i.e., a recommendation target user when it recognizes the terminal device 10 where a content recommendation event has taken place.

In particular, the content recommendation device 100 recommends content that is directly related with a user (recommendation target user) as personalized content, as described above.

To that end, the content recommendation device 100 analyzes registered meta information and collected review information for each of multiple content items and creates a content vector for every content item.

In addition, the content recommendation device 100 checks a content consumption history of the user of the terminal device 10 where the content recommendation event has taken place, i.e., the recommendation target user, and then creates a user vector associated with the recommendation target user based on the checked content consumption history of the recommendation target user and the content vector of each of consumption content items belong to the content consumption history.

Then, the content recommendation device 100 chooses at least one recommendation content item from among multiple content items based on a similarity between the created user vector of the recommendation target user and the content vector each of the multiple content items, and provides the chosen recommended content item, i.e., the personalized content for the user of the terminal device 10 (recommendation target user) to the terminal device 10. By doing so, the content recommendation device 100 can recommend the content item directly related with the recommendation target user.

Figure 2:
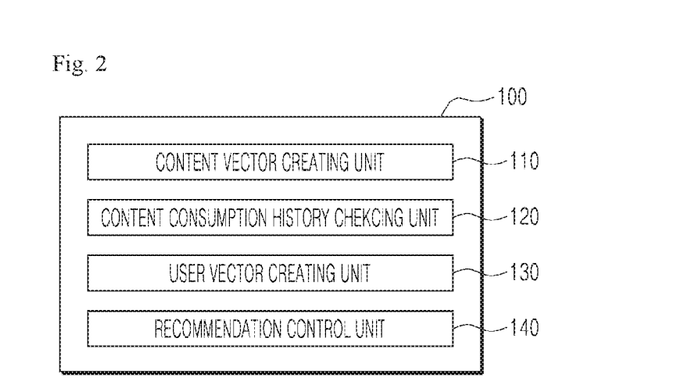
FIG. 2 is a block diagram of a content recommendation device according to an exemplary embodiment of the present disclosure.

Hereinafter, a configuration of a content recommendation device according to an embodiment of the present disclosure will be described in detail with reference to FIG. 2.

The content recommendation device 100 according to an exemplary embodiment of the present disclosure includes: a content vector creating unit 110 that analyzes meta information and collected review information of each of multiple content items to create a content vector for every content item; a consumption history checking unit 120 that checks a content consumption history of a recommendation target user; a user vector creating unit 130 that creates a user vector of the recommendation target user based on the content consumption history of the recommendation target user and the content vector of each of consumption content items belonging to the content consumption history; and a recommendation control unit 140 that chooses at least one recommended content item from among the multiple content items based on a similarity between the user vector of the recommendation target user and the content vector of each of the multiple content items.

In the following description, for convenience of illustration, it is assumed that a recommendation target user is a user of a terminal device 10 where the content recommendation event has taken place, as described above.

The content vector creating unit 110 analyzes registered meta information and collected review information for each of multiple content items and creates a content vector for every content item.

That is, the content vector creating unit 110 analyzes registered meta information and collected review information for each of multiple content items to create a content vector for every content item, thereby creating content vectors for respective content items.

The multiple content items are ones recommendable to a user and may be stored and managed in a memory (not shown) of the content recommendation device 100 or in a separate content DB (not shown).

As used herein, content may be on-line content such as movies, music or games, or may be off-line content such as garments or foods.

In the following description, a process of creating a content vector for every content item will be described in detail. For convenience of illustration, description will be made with respect to one content item among multiple content items (hereinafter referred to as a particular content item).

The content vector creating unit 110 extracts a topic keyword from meta information of a particular content item based on several predetermined topic keywords, and extracts an emotional keyword from review information of the particular content item based on several predetermined emotional keywords.

After the topic keywords and the emotional keywords are extracted from the particular content item, the content vector creating unit 110 may create a content vector of the particular content item in which keyword weight values based on an extraction result of the topic keywords and an extraction result of the emotional keywords are reflected in each of the topic keywords and emotional keywords.

As used herein, the topic keyword refer to a fact keyword that can describe a content item objectively, such as a subject the content deals with, materials, appearance, a category, an abstract, etc.

Different topic keywords may be determined in advance for different categories of content.

As used herein, the emotional keyword refers to an opinion keyword that can describe a user's opinion on a content item subjectively, such as that a content item is boring, not interesting, incontinent to use, etc.

Different emotional keywords may be determined in advance for different categories of content.

In the following description, it is assumed that the particular content item is a movie.

The content vector creating unit 110 may extract a topic keyword from meta information of a particular content item based on several predetermined topic keywords for a movie category of the particular content item.

More specifically, if the particular content item is a movie, the meta information of the content may include essential meta such as a category title, a producer and a production date, and optional meta such as a movie genre, description or brief story and other information.

For example, the meta information of the particular content item may include category: movie, title: movie title, producer: director/actors/film distributors, etc., production data: production year/release year, genre: action, description: synopsis distributed by producer, other information: production country/film rating/reviews, etc.

In this case, the content vector creating unit 110 may extract a topic keyword from the meta information of the particular content item based on several predetermined topic keywords for the movie category of the particular content item.

For example, the content vector creating unit 110 may extract the following topic keywords from the meta information of the particular content item:

Topic keywords: 1980's, true story, human right, lawyer, counselor, political struggles in Pusan-Masan, torture, prosecutor, trial, pro-democracy movement, . . .

The content vector creating unit 110 may extract an emotional keyword from the review information of the particular content item based on several predetermined emotional keywords for the movie category of the particular content item.

More specifically, the content vector creating unit 110 may be connected to a service server (not shown) providing a variety of content services on a web-basis or an application-basis and may collect review information such as replies for each of multiple content items in addition to the particular content item.

It will be appreciated that the content vector creating unit 110 may collect review information for each of multiple content items managed in the content recommendation device 100 if the content recommendation device 100 directly provides content service.

For example, the review information of the particular content item includes comments such as "young people's dreams and reality are described well without being exaggerated," "I like the narration," "I like the way of speaking slowly and the funny lines," "the movie was boring," "I like the movie beyond expectation" and so on.

In this case, the content vector creating unit 110 extracts an emotional keyword from the review information of the particular content item based on several predetermined emotional keywords for the movie category.

For example, the content vector creating unit 110 may extract the following emotional keywords from the review information of the particular content item:

emotional keywords: "the movie makes me shudder," "the acting was excellent," "the movie reflects the reality," "I was moved by the movie," "good actors," "the actor speaks the dialect naturally," and so on.

The topic keywords and emotional keywords are extracted by extracting a noun, a noun phrase, a verb and a verb phrase through morphological analysis and chunking. This method may be carried out in the same manner as or a similar manner to the existing method of extracting keywords using the natural language processing (NLP) technique.

After the topic keywords and the emotional keywords are extracted from the particular content item, the content vector creating unit 110 may create a content vector of the particular content item by reflecting keyword weight values based on an extraction result of the topic keywords and an extraction result of the emotional keywords in each of the topic keywords and emotional keywords.

The created content vectors of the particular content item will be described in detail below.

The content vector of the particular content item includes keyword fields each corresponding to the respective topic keywords and emotional keywords used in extracting the topic keywords and the emotional keywords.

For example, if there are twenty topic keywords and twenty-five emotional keywords, the content vector of the particular content item includes a total of forty-five keyword fields each corresponding to the respective topic keywords and emotional keywords.

For example, the content vector of the particular content item may include the following keyword fields each corresponding to the respective topic keywords and emotional keywords:

{1980s, "the movie makes me shudder," "the acting was excellent," "based on the true story," "the movie reflects the reality," "Pusan," "Ro Mu-hyun," "Song Gang-ho's performance," "human right," "lawyer," "counselor," "Yi Young-ae," "black noodle," "the office," "political struggles in Pusan-Masan," "torture," "prosecutor," "trial," "protests," "Jeon Du-hwan," "I was moved by the movie," "good actors," "the actor speaks the dialect naturally," "father," "wife," "moving into the house," "hanging new papers"}

Each of the keyword fields included in the content vector of the particular content item may include a keyword weight value for a topic keyword or an emotional keyword corresponding to the keyword, which is based on an extraction result of the topic keyword or an extraction result of the emotional keyword.

The keyword weight value may be a determined (calculated) value in proportion to the number of times a (topic or emotional) keyword is exposed based on the extraction result of the topic keyword and the extraction result of the emotional keyword, The content vector of the particular content item created by reflecting keyword weight values based on an extraction result of the topic keywords and an extraction result of the emotional keywords in the respective topic keywords and emotional keywords may include keyword weight values of the (topic or emotional) keywords for the respective keyword fields as follows:

content vector of the particular content item={0.015, 0.025, 0.020, . . . } where 0.015 may mean a keyword weight value of the topic keyword "1980s," 0.025 may mean a keyword weight value of the emotional keywords "the movie makes me shudder," and 0.020 may mean a keyword weight value of the emotional keywords "the acting was excellent."

In this manner, the content vector creating unit 110 may create a content vector for every content item in addition to the particular content.

Consequently, according to the exemplary embodiment, the content vector is created for every content item, which takes into account unspecified user's subjective emotions as well as an objective topic on a content item.

The consumption history checking unit 120 checks a content consumption history of a recommendation target user.

That is, the consumption history checking unit 120 checks the content consumption history of a user of a terminal 10 where a content recommendation event has taken place, i.e., a recommendation target user. In other words, the consumption history checking unit 120 checks the history of content items consumed by the recommendation target user in the past.

Examples of the history of consumed content items include purchasing a content item, downloading a content item, adding a content item to a watch list, rating a star score, writing a comment, etc.

For example, the consumption history checking unit 120 may check the following content consumption history of a recommendation target user:

content consumption history of a recommendation target user={movie A, movie B and movie C}

The consumption history checking unit 120 may check the content consumption history of the recommendation target user while applying different consumption weight values based on star scores on content items consumed by the recommendation target user in the past.

For example, if a recommendation target user has given a star score on movie A but has not given star scores on movies B and C, the weighted content consumption history of the recommendation target user may be checked as follows:

content consumption history of a recommendation target user={start score of the recommendation target user*movie A, basic score*movie B and basic score*movie C}

That is, the consumption weight values correspond to the recommendation user's the star score and the basic star scores.

The basic star score means an average star score (e.g., seven stars out of ten) on the category of a content item (movie) given by ordinary users irrespectively of the content item. If the star score on movie A given by a recommendation target user is higher than the basic star score, it indicates that the recommendation user's greater propensity to consume movie A. If the star score on movie A given by the recommendation target user is lower than the basic star score, it indicates that the recommendation user's lesser propensity to consume movie A.

In the following description, for convenience of illustration, it is assumed that the weighted content consumption history of the recommendation target user based on the star score has been checked as follows:

content consumption history of the recommendation target user={1.0*movie A, 0.7*movie B and 0.3*movie C}

Once the consumption history checking unit 120 checks the content consumption history of the recommendation target user, the user vector creating unit 130 creates a user vector of the recommendation target user based on the content consumption history of the recommendation target user and the content vector of each of the consumption content items belonging to the content consumption history.

More specifically, the user vector creating unit 130 searches the created content vectors of the multiple content items for the consumption content items belonging to the content consumption history of the recommendation target user, i.e., the content vectors of movies A, B and C (hereinafter referred to as content vectors A, B and C).

As described above, the content consumption history of the recommendation target user checked by the consumption history checking unit 120 includes the consumption weight values of 1.0, 0.7 and 0.3 on the consumption content items, i.e., movies A, B and C.

The user vector creating unit 130 may create a user vector of the recommendation target user by applying the consumption weight values of 1.0, 0.7, 0.3 of the consumption content items, i.e., movies A, B and C, respectively, included in the content consumption history of the recommendation target user to the content vectors of the consumption content items, i.e., content vectors A, B and C of movies A, B and C, respectively.

For example, the user vector creating unit 130 may create the following user vector of the recommendation target user:

the user vector of the recommendation target
user={1.0*content vector A, 0.7*content vector
B, and 0.3*content vector C}

That is, according to the exemplary embodiment of the present disclosure, the user vector of the recommendation target user is created by reflecting the content vector that takes into account unspecified users' subjective emotions (opinions) in addition to an objective topic (fact) on the content in a content item consumed (e.g., purchased, downloaded, etc.) by the recommendation target user. As a result, even if the content consumption history of the recommendation target user is insufficient, i.e., the recommendation target user's direct opinions (e.g., giving a star score, writing a comment, etc.) are somewhat insufficient, it is possible to create the user vector by taking into account the recommendation target user's expected subjective emotion (opinion).

Once the user vector creating unit 130 creates the user vector of the recommendation target user, the recommendation control unit 140 chooses at least one recommendation content item from among multiple content items based on a similarity between the user vector of the recommendation target user and the content vector of each of the multiple content items.

For example, the recommendation control unit 140 may calculate similarities between the user vector of the recommendation target user and the content vector of each of the multiple content items to compare them, and may perform filtering to choose, from among the multiple content items, n content items including one having the highest similarity to one having the (n-1)$^{th}$ highest similarity with the user vector of the recommendation target user, as recommended content items.

Alternatively, the recommendation control unit 140 may calculate similarities between the user vector of the recommendation target user and the content vector of each of the multiple content items to compare them, and may perform filtering to choose, from among the multiple content items, content items each having a similarity with the user vector of the recommendation target user above a predetermined threshold similarity, as recommended content items.

By doing so, the recommendation control unit 140 may provide the information of the chosen recommendation content items, e.g., a list of recommended content items to the terminal device 10, thereby recommending personalized content to the user of the terminal device 10 (the recommendation target user).

Additionally, an additional similarity table may be created in advance so as to simplify the process of choosing recommended content items.

That is, the recommendation control unit 140 may create in advance a similarity table storing similarities among the content items based on the content vectors of multiple content items.

In this case, once the user vector creating unit 130 creates the user vector of the recommendation target user, the recommendation control unit 140 may search multiple content items for some content items based on similarities with the consumption content items, i.e., movies A, B and C by referring to a similarity table, and then may choose recommended content items based on a similarity between the user vector of the recommendation target user and each of the some found content items.

For example, the recommendation control unit 140 may extract, from multiple content items, one hundred content items whose content vector has high similarities with the content vector of movie A, one hundred content items whose content vector has high similarities with the content vector of movie B, and one hundred content items whose content vector has high similarities with the content vector of movie C based on the similarity table. Then, the recommendation control unit 140 may search the extracted three hundreds content items for the some content items.

Then, the recommendation control unit 140 may choose recommended content items based on the similarities between the user vector of the recommendation target user and the content vectors of the found some content items.

That is, the recommendation control unit 140 calculates similarities between the user vector of the recommendation target user and the content vectors of some of the three hundreds content items to compare them, and choose recommended content items from among the multiple content items, more specifically some of the three hundreds content items.

For example, if there are one million content items, similarities between the user vector of the recommendation target user and the one million content items have to be calculated and compared with one another, without a similarity table. In contrast, with a similarity table, a less amount of similarity calculation and comparison, e.g., three hundred times, is required to choose recommended content items. As a result, the process of choosing recommended content items is simplified and the overhead is reduced.

The similarities may be calculated in any of existing ways of calculating cosine similarity or BM25 similarity; and, therefore, the process will not be described herein.

As described above, the content recommendation device 100 according to the exemplary embodiment of the present disclosure may create the user vector that takes into account the recommendation target user's expected subjective emotion (opinion) by using the content vectors created by taking into account unspecified users' subjective emotions (opinions) as well as an objective topic (fact) on a content item. Then, the content recommendation device 100 directly may compare the user vector of the recommendation target user with the similarity among the content vectors of multiple content items to thereby choose a recommended content item.

Accordingly, the content recommendation device 100 according to the exemplary embodiment of the present disclosure can recommend personalized content directly related with a user (the recommendation target user), irrespectively of whether the content consumption history of the recommendation target user is sufficient to analyze the purchase/use pattern or whether there are other users having similar purchase/user pattern with the recommendation target user. As a result, the recommendation reliability can be improved.

Moreover, the content recommendation device 100, especially the user vector creating unit 130 may create a user vector for each of multiple users in advance in a similar manner to the above-described creating the user vector of the recommendation target user.

For example, if a predetermined update period has been reached or a predetermined update condition takes place, the user vector creating unit 130 may create (update) a user vector of each of multiple users to manage it.

In this case, the recommendation control unit 140 may further choose at least one recommendation target user from among multiple users based on similarities between the user vector of the recommendation target user created at this time and the already created user vector of each of the multiple users.

For example, the recommendation control unit 140 may calculate similarities between the user vector of the recommendation target user and the user vector of each of the multiple users to compare them, and may perform filtering to choose, from among the multiple users, m users including one having the highest similarity to one having the $(n-1)^{th}$ highest similarity with the user vector of the recommendation target user, as recommended users.

Alternatively, the recommendation control unit 140 may calculate similarities between the user vector of the recommendation target user and the user vector of each of the multiple users to compare them, and may perform filtering to choose, from among the multiple users, users each having a similarity with the user vector of the recommendation target user above a predetermined threshold similarity, as recommended users.

The similarities may be calculated in any of existing ways of calculating cosine similarity or BM25 similarity; and, therefore, the process will not be described herein.

Once the user vector creating unit 130 creates the user vector of the recommendation target user, the recommendation control unit 140 may choose recommended content items from among multiple content items based on a similarity between the user vector of the recommendation target user and the content vector of each of the multiple content items as described above, while it may further choose recommended users based on a similarity between the user vector of the recommendation target user and a user vector of each of multiple users.

In this case, the recommendation control unit 140 may provide the information of the chosen recommended content items, e.g., a list of recommended content items and the information of the chosen recommended users, e.g., a list of recommended users to the terminal device 10, thereby recommending personalized content and other users to the user of the terminal device 10 (the recommendation target user).

Once the recommended users are chosen as described above, the recommendation control unit 140 may choose a content item that all of the chosen recommended users have consumed as a recommended content item based on the content consumption histories of the chose recommended users.

In the following description, for convenience of illustration, a recommended content item that is chosen based on the user vector of the recommendation target user and the similarity among the content vectors of the multiple content items is referred to as to a first recommended content item, while a recommended content time that all of the chosen recommended users have consumed is referred to as a second content item.

In this case, the recommendation control unit 140 may provide the information of the first recommended content items, e.g., a list of first recommended content items and the information of the second recommended content items, e.g., a list of second recommended content items to the terminal device 10, thereby recommending personalized content to the user of the terminal device 10 (the recommendation target user).

The recommendation control unit 140 may apply different recommendation weight values for the first recommended content items and the second recommended content items depending on the categories of the first and second recommended content items.

Specifically, the recommendation control unit 140 may apply a higher recommendation weight to the first recommended content items than the second recommended content items if the association between content items is more important than the association between users in the category.

On the other hand, the recommendation control unit 140 may apply a higher recommendation weight to the second recommended content items than the first recommended content items if the association between users is more important than the association between content items in the category.

For example, a category where the association between content items is more important than the association between users may be off-line content such as garments or foods. A category where the association between users is more important than the association between content items may be on-line content such as movies, music or games.

If the category of the first recommended content items and the second recommended content items is a movie, the recommendation control unit 140 may apply a higher recommendation weight value to the first recommended content items than the second recommended content items and may provide the terminal device 10 with a list of combined recommended content items in which both of the first and second recommended content items are listed in the order according to the recommendation weight values.

In addition, the recommendation control unit 140 may reorder the first and second recommended items in the list according to the quality or release date of the content items and then provide the list to the terminal device 10.

As described above, the content recommendation device 100 according to the exemplary embodiment of the present disclosure may create the user vector that takes into account the recommendation target user's expected subjective emotion (opinion) by using the content vectors created by taking into account unspecified users' subjective emotions (opinions) as well as an objective topic (fact) on a content item. Then, the content recommendation device 100 may choose recommended content items and recommend them based on the similarity between the user vector of the recommendation target user and the content vectors of multiple content items or based on similarity between the user vector of the recommendation target user and the user vectors of multiple users.

Accordingly, the content recommendation device 100 according to the exemplary embodiment of the present disclosure can recommend personalized content directly related with a recommendation target, irrespectively of whether the content consumption history of the recommendation target user is sufficient to analyze the purchase/use pattern or whether there are other users having similar purchase/user pattern with the recommendation target user. As a result, the recommendation reliability can be improved.

Figure 3:
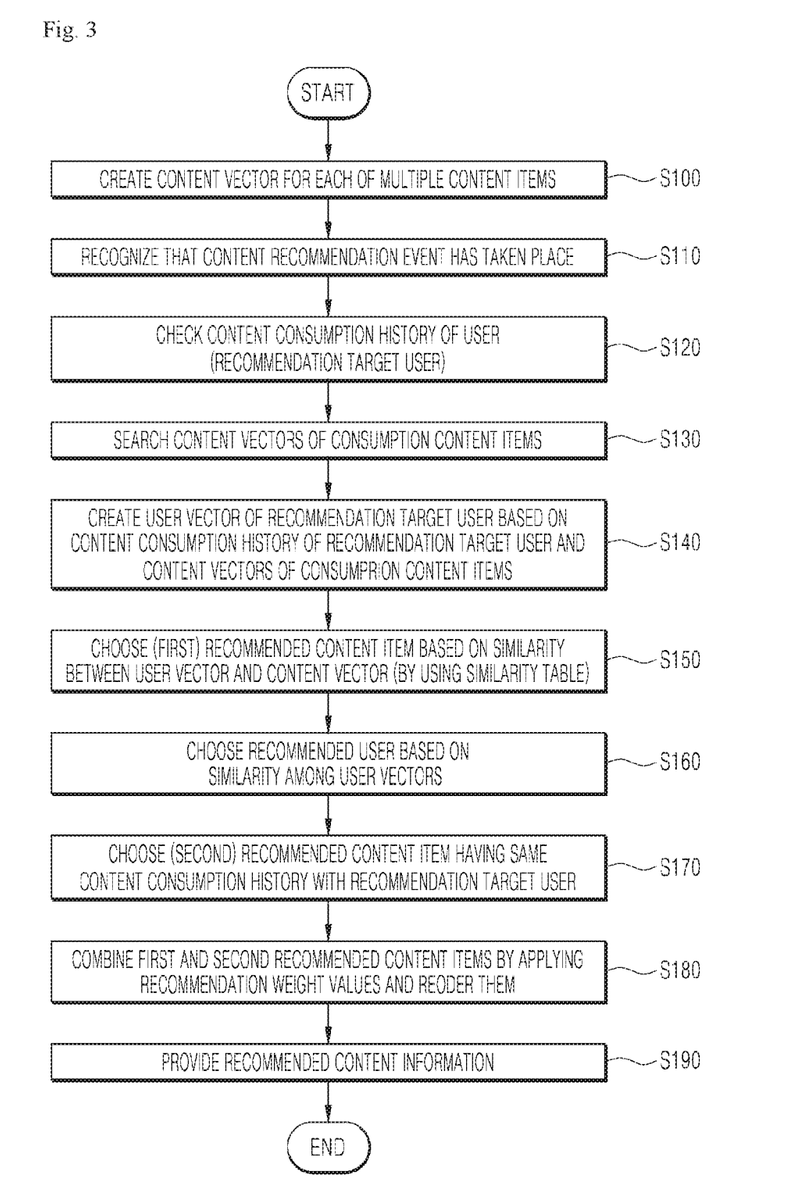
FIG. 3 is a flowchart for illustrating a method of operating a content recommendation device according to an exemplary embodiment of the present disclosure.

Hereinafter, a method of operating a content recommendation device according to an embodiment of the present disclosure will be described in detail with reference to FIG. 3. For convenience of illustration, in describing the method shown in FIG. 1, the same reference numerals as those of FIGS. 1 and 2 are used.

The method of operating the content recommendation device 100 according to the exemplary embodiment of the present disclosure includes analyzing registered meta information and collected review information of each of multiple content items to create content vectors (step S100).

That is, in the method of the operating the content recommendation device 100 according to the exemplary embodiment, registered meta information and collected review information for each of multiple content items are analyzed to create a content vector for every content item.

In the following description, a process of creating a content vector for every content item will be described in detail. For convenience of illustration, description will be made with respect to one content item among multiple content items (hereinafter referred to as a particular content item).

The method of operating the content recommendation device 100 according to the exemplary embodiment includes extracting a topic keyword from meta information of a particular content item based on several predetermined topic keywords, and extracting an emotional keyword from review information of the particular content item based on several predetermined emotional keywords.

Then, the method of operating the content recommendation device 100 according to the exemplary embodiment includes, after extracting the topic keywords and the emotional keywords from the particular content item, creating a content vector of the particular content item in which keyword weight values based on the extraction result of the topic keywords and the extraction result of the emotional keywords are reflected in the respective topic keywords and emotional keywords.

As used herein, the topic keyword refer to a fact keyword that can describe a content item objectively, such as a subject the content deals with, materials, appearance, a category, an abstract, etc.

As used herein, the emotional keyword refers to an opinion keyword that can describe a user's opinion on a content item subjectively, such as that a content item is boring, not interesting, incontinent to use, etc.

In the following description, it is assumed that the particular content item is a movie.

The method of operating the content recommendation device 100 according to the exemplary embodiment may include extracting a topic keyword from meta information of a particular content item based on several predetermined topic keywords for a movie category.

More specifically, if the particular content item is a movie, the meta information of the content item may include essential meta such as a category title, a producer and a production date, and optional meta such as a movie genre, description or brief story and other information.

For example, the meta information of the particular content item may include category: movie, title: movie title, producer: director/actors/film distributors, etc., production data: production year/release year, genre: action, description: synopsis distributed by producer, other information: production country/film rating/reviews, etc.

In this case, the method of operating the content recommendation device 100 according to the exemplary embodiment includes extracting a topic keyword from the meta information of the particular content item based on several predetermined topic keywords for the movie category.

For example, the method of operating the content recommendation device 100 according to the exemplary embodiment includes extracting the following topic keywords from the meta information of the particular content item:

Topic keywords: 1980's, true story, human right, lawyer, counselor, political struggles in Pusan-Masan, torture, prosecutor, trial, pro-democracy movement, . . . .

The method of operating the content recommendation device 100 according to the exemplary embodiment includes extracting a motion keyword from review information of the particular content item based on several predetermined emotional keywords for the movie category.

More specifically, the method of operating the content recommendation device 100 according to the exemplary embodiment includes connecting the content recommendation device 100 to a service server (not shown) providing a variety of content services on a web-basis or an application-basis and may collect review information such as replies for each of multiple content items in addition to the particular content item.

It will be appreciated that the method of operating the content recommendation device 100 according to the exemplary embodiment may include collecting review information for each of multiple content items managed in the content recommendation device 100 if the content recommendation device 100 directly provides content service.

For example, the review information of the particular content item includes comments such as "young people's dreams and reality are described well without being exaggerated," "I like the narration," "I like the way of speaking slowly and the funny lines," "the movie was boring," "I like the movie beyond expectation" and so on.

In this case, the method of operating the content recommendation device 100 according to the exemplary embodiment includes extracting an emotional keyword from the review information of the particular content item based on several predetermined review keywords for the movie category.

For example, the method of operating the content recommendation device 100 according to the exemplary embodiment includes extracting the following emotional keywords from the review information of the particular content item:

emotional keywords: "the movie makes me shudder," "the acting was excellent," "the movie reflects the reality," "I was moved by the movie," "good actors," "the actor speaks the dialect naturally," and so on.

Then, the method of operating the content recommendation device 100 according to the exemplary embodiment may include, after extracting the topic keyword and the emotional keyword from the particular content item, creating a content vector of the particular content item by reflecting keyword weight values based on the extraction result of the topic keywords and the extraction result of the emotional keywords are reflected in the respective topic keywords and emotional keywords.

For example, the content vector of the particular content item may include the following keyword fields each corresponding to the respective topic keywords and emotional keywords:

{1980s, "the movie makes me shudder," "the acting was excellent," "based on the true story," "the movie reflects the reality," "Pusan," "Ro Mu-hyun," "Song Gang-ho's performance," "human right," "lawyer," "counselor," "Yi Young-ae," "black noodle," "the office," "political struggles in Pusan-Masan," "torture", "prosecutor," "trial," "protests," "Jeon Du-hwan," "I was moved by the movie," "good actors," "the actor speaks the dialect naturally," "father," "wife," "moving into the house," "hanging new papers"}

Each of the keyword fields of the content vector of the particular content item may include a keyword weight value in a topic keyword or an emotional keyword corresponding to the keyword, which is based on a result of the topic keyword extraction or a result of the emotional keyword extraction.

As used herein, a keyword weight value may be a value determined (calculated) value in proportion to the number of time a (topic or emotional) keyword is exposed based on the extraction result of the topic keywords and the extraction result of the emotional keywords, In the method of operating the content recommendation device 100 according to the exemplary embodiment of the present disclosure, the content vector of the particular content item created by reflecting keyword weight values based on an extraction result of the topic keywords and an extraction result of the emotional keywords in the respective topic keywords and emotional keywords may include keyword weight values of the (topic or emotional) keywords for the respective keyword fields as follows:

content vector of the particular content item={0.015, 0.025, 0.020, . . . } where 0.015 may mean a keyword weight value of the topic keyword "1980s," 0.025 may mean a keyword weight value of the emotional keywords "the movie makes me shudder," and 0.020 may mean a keyword weight value of the emotional keywords "the acting was excellent."

In this manner, the method of operating the content recommendation device 100 according to the exemplary embodiment may create a content vector for each of multiple content items in addition to the particular content item (step S100).

Consequently, according to the exemplary embodiment, the content vector is created for every content item, which takes into account unspecified user's subjective emotions as well as an objective topic on a content item.

The method of operating the content recommendation device 100 according to the exemplary embodiment includes, upon recognizing the terminal device 10 where a content recommendation event has taken place (step S100), checking a content consumption history of the user of the terminal 10, i.e., the recommendation target user (step S120).

Examples of the history of consumed content items include purchasing a content item, downloading a content item, adding a content item to a watch list, rating a star score, writing a comment, etc.

For example, the method of operating the content recommendation device 100 according to the exemplary embodiment may include checking the following content consumption history of a recommendation target:

content consumption history of a recommendation target user={movie $A$, movie $B$ and movie $C$}

The method of operating the content recommendation device 100 according to the exemplary embodiment may include checking the content consumption history while applying different consumption weight values based on star scores on content items consumed by the recommendation target user in the past.

For example, if a recommendation target user has given a star score on movie A but has not given star scores on movies B and C, the weighted content consumption history of the recommendation target user may be checked as follows:

content consumption history of a recommendation target user={start score of the recommendation target user*movie $A$, basic score*movie $B$ and basic score*movie $C$}

That is, the consumption weight values correspond to the recommendation user's the star score and the basic star scores.

The basic star score means an average star score (e.g., seven stars out of ten) on the category of a content item (movie) given by ordinary users irrespectively of the content item. If the star score on movie A given by a recommendation target user is higher than the basic star score, it indicates the recommendation user's greater propensity to consume movie A. If the star score on movie A given by the recommendation target user is lower than the basic star score, it indicates that the recommendation user's lesser propensity to consume movie A.

In the following description, for convenience of illustration, it is assumed that the weighted content consumption history of the recommendation target user based on the star score has been checked as follows:

content consumption history of the recommendation target user={1.0*movie $A$, 0.7*movie $B$ and 0.3*movie $C$}

The method of operating the content recommendation device 100 according to the exemplary embodiment may include, once the content consumption history of the recommendation target user is checked in step S120, creating a user vector of the recommendation target user based on the content consumption history of the recommendation target user and the content vector of each of the consumption content items belonging to the content consumption history.

More specifically, the method of operating the content recommendation device 100 according to the exemplary embodiment includes searching for the content vectors of the created multiple content items for the consumption content items belonging to the content consumption history of the recommendation target user, i.e., the content vectors of movies A, B and C (hereinafter referred to as content vectors A, B and C) (step S130).

As described above, the content consumption history of the recommendation target user checked in step S120 includes the consumption weight values of 1.0, 0.7 and 0.3 on the consumption content items, i.e., movies A, B and C.

The method of operating the content recommendation device 100 according to the exemplary embodiment may include creating a user vector of the recommendation target user by applying the consumption weight values of 1.0, 0.7, 0.3 of the consumption content items, i.e., movies A, B and C, respectively, included in the content consumption history of the recommendation target user to the content vectors of the consumption content items, i.e., movies A, B and C (step S140).

For example, the method of operating the content vector creating unit 100 according to the exemplary embodiment may include creating the following user vector of a recommendation target:

the user vector of the recommendation target user={1.0*content vector $A$, 0.7*content vector $B$ and 0.3*content vector $C$}

That is, according to the exemplary embodiment of the present disclosure, the user vector of the recommendation target user is created by reflecting the content vector that takes into account unspecified users' subjective emotions (opinions) in addition to a subjective topic (fact) on the content in a content item consumed (e.g., purchased, downloaded, etc.) by the recommendation target user. As a result, even if the content consumption history of the recommendation target user is insufficient, i.e., the recommendation target user's direct opinions (e.g., giving a star score, writing a comment, etc.) are somewhat insufficient, it is possible to create the user vector by taking into account the recommendation target user's expected subjective emotion (opinion).

Then, the method of operating the content recommendation device 100 according to the exemplary embodiment of the present disclosure may include, once the user vector of the recommendation target user is created in step S140, choosing at least one recommendation content item from among multiple content items based on a similarity between the user vector of the recommendation target user and the content vector of each of the multiple content items (step S150).

More specifically, the method of operating the content recommendation device 100 may include creating in advance a similarity table storing similarities among the content items based on the content vectors of the multiple content items.

In this case, the method of operating the content recommendation device 100 may include, once the user vector of the recommendation target user is created in step S140, searching multiple content items for some content items based on similarities with the consumption content items, i.e., movies A, B and C by referring to a similarity table, and then may choose recommended content items based on a similarity between the user vector of the recommendation target user and each of the some found content items.

For example, the method of operating the content recommendation device 100 may include extracting, from multiple content items, one hundred content items whose content vector has high similarities with the content vector of movie A, one hundred content items whose content vector has high similarities with the content vector of movie B, and one hundred content items whose content vector has high similarities with the content vector of movie C based on the similarity table. Then, the method may include searching the extracted three hundreds content items for the some content items.

Then, the method of operating the content recommendation device 100 may include choosing recommended content items based on the similarities between the user vector of the recommendation target user and the content vectors of the found some content items.

That is, the method of operating the content recommendation device 100 may include calculating similarities between the user vector of the recommendation target user and the content vectors of some of the three hundreds content items to compare them, and choosing recommended content items from among the multiple content items, more specifically some of the three hundreds content items.

Moreover, the method of operating the content recommendation device 100 may include creating a user vector for each of multiple users in advance in a similar manner to the above-described creating the user vector of the recommendation target user.

In this case, the method of operating the content recommendation device 100 may include further choosing at least one recommendation target user from among multiple users based on similarities between the user vector of the recommendation target user created at this time and the already created user vector of each of the multiple users (step S160).

Then, the method of operating the content recommendation device 100 may include, once the recommended users are chosen in step S160, choosing a content item that all of the chosen recommended users have consumed as a recommended content item based on the content consumption histories of the chose recommended users (step S140).

In the following description, for convenience of illustration, a recommended content item that is chosen in step S150 is referred to as to a first recommended content item, while a recommended content time that is chosen in step S170 is referred to as a second content item.

The method of operating the content recommendation device 100 may include applying different recommendation weight values for the first recommended content items and the second recommended content items depending on the categories of the first and second recommended content items.

Specifically, the method of operating the content recommendation device 100 may include applying a larger recommendation weight to the first recommended content items than the second recommended content items if the association between content items is more important than the association between users in the category. On the other hand, the method of operating the content recommendation device 100 may include applying a larger recommendation weight to the second recommended content items than the first recommended content items if the association between users is more important than the association between content items in the category.

For example, a category where the association between content items is more important than the association between users may be off-line content such as garments or foods. A category where the association between users is more important than the association between content items may be on-line content such as movies, music or games.

The method of operating the content recommendation device 100 may include, if the category of the first recommended content items and the second recommended content items is a movie, applying a higher recommendation weight value to the first recommended content items than the second recommended content items and combining the first and second recommended content items to order them according to the recommendation weight values. The method of operating the content recommendation device 100 may further include reordering the first and second recommended content items according to the quality or release date of the content items (step S180). Then, the method may include providing to the terminal device 10 a list of combined recommended content items in which both of the first and second recommended content items are listed (step S190).

Accordingly, the method of operating the content recommendation device 100 according to the exemplary embodiment of the present disclosure can recommend personalized content directly related with a recommendation target, irrespectively of whether the content consumption history of the recommendation target user is sufficient to analyze the purchase/use pattern or whether there are other users having similar purchase/user pattern with the recommendation target user. As a result, the recommendation reliability can be improved.

Meanwhile, the realized articles of functional operations and subject matters described in this specification can be implemented using digital electronic circuits, or implemented as computer software, firmware, or hardware including the configuration disclosed in this specification and structural equivalents thereof, or as a combination be at least one of these implementations. The articles of realization of the subject matter described in this specification can be implemented as one or more computer program product, that is, one or more module related to computer program instructions which are encoded on a tangible program storage medium for controlling the operation of the process system or for being executed by the same.

The computer-readable medium can be a machine-readable storage device, a machine-readable storage board, a memory device, a composition of materials affecting machine-readable wave signals, and a combination of at least one of them.

The term such as "a system" or "a device" in this specification encompasses all tools, devices, and machines for processing data including, for example, a programmable processor, a computer, or a multi-processor. The process system can include a code for creating an execution atmosphere for the computer program, when requested by a code constituting a processor firmware, a protocol stack, a database management system, an operating system, or a combination of at least one of them, etc., in addition to a hardware.

The computer (also known as a program, a software, a software application, a script, or a code) can be created in all types of program languages including a compiled or interpreted language or a priori or procedural language, and can be arranged in all types including standalone programs, modules, subroutines, and other units proper to be used in a computing environment. The computer program does not necessarily correspond to a file of a file system. The program can be stored in a single file provided by the requested program, in multiple files which interact with each other (for example, files storing one or more module, low level programs or some of the code), or in a part of the file containing other programs or data (for example, one or more script stored in a markup language document). The computer program can be arranged to be positioned in one site or distributed over a plurality of sites, such that it can be executed on multiple computers interconnected via a communication network or on a single computer.

Meanwhile, the computer-readable medium which is proper for storing computer program instructions and data can include and all types of nonvolatile memories, media, and memory devices including a semiconductor memory device such as EPROM, EEPROM and flash memory device, a magnetic disk such as internal hard disk or removable disk, optical disk, a CD-ROM and a DVD-ROM disk. The processor and the memory can be supplemented by a special purpose logic circuit or integrated into the same.

The article of realization of the subject matter described in this specification can include a back-end component such as a data server, a middleware component such as an application server, or a front-end component such as a client computer having a web browser or a graphic user interface which enables a user to interact with the article of realization of the subject matter described in this specification, or can implement all combinations of these back-end, middleware, or front-end components in a computing system. The components of a system can be interconnected with each other by all types or media of digital data communication such as a communication network.

Although this specification includes details of various specific implementations, it is not to be understood as limiting for all inventions or scope to be claimed, and it should rather be understood as an explanation for the features which can be unique to specific implementations of the specific invention. Similarly, the specific features described in this specification in the context of separate implementations can be implemented to be combined in a single implementation. On the contrary, various features described in the context of the single implementation can also be implemented as discrete or proper low level combinations as well as in various implementations. Furthermore, although the features can be depicted as work in a specific combination and as claimed in the first place, one or more features from the claimed combination can be excluded from the combination in some cases, and the claimed combination can be changed to the low level combinations or subcombinations.

Also, although this specification depicts the operations in a specific order in the drawings, it is not to be understood that this specific sequence or order should be maintained or all the shown operations should be performed in order to obtain the preferred results in specific cases, multitasking and parallel processing can be preferable. Also, the division of various system components of the aforementioned embodiments are not to be construed as being required by all embodiments, and it is to be understood that the described program components and systems can generally be unified into a single software product or packaged in multiple software products.

Similarly, this specification is not intended to limit the present invention to specific terms provided. Therefore, although the present invention has been explained in detail by referring to the aforementioned examples, it is possible for the person having ordinary skill in the art to alter, change, or modify these examples without departing from the scope of the present invention. The scope of the present invention is expressed by the claims, not by the specification, and all changes and modified shapes derived from the meanings of the claims, scopes, and the equivalents thereof are construed to be included in the scope of the present invention.

What is claimed is:

1. A content recommendation device comprising:
a content vector creating circuit configured to:
analyze registered meta information and collected review information of each of multiple content items,
extract a topic keyword from meta information of a particular content item among the multiple content items based on predetermined topic keywords using a natural language processing technique,
extract an emotional keyword from review information of the particular content item made by other users based on predetermined emotional keywords using the natural language processing technique, the emotional keyword referring to subjective opinions of the other users on the particular content item, the extracted emotional keyword being one of a plurality of emotional keywords assigned to a category of contents to which the particular content belongs, each category of contents assigned with different emotional keywords, the review information separate from the meta information, and
assign keyword weight values based on the extracted topic keyword and the extracted emotional keyword to create a content vector for each of multiple content items so that the content vector comprises the keyword weight values corresponding to the extracted topic keyword and the extracted emotional keyword;
a consumption history checking circuit configured to check a content consumption history including consumption content items of a recommendation target user, wherein the content consumption history of the recommendation target user comprises a consumption weight value corresponding to a feedback provided by the recommendation target user on each of the consumption content items;
a user vector creating circuit configured to search content vectors of the multiple content items, and create a user vector of the recommendation target user by applying consumption weight values of the consumption content items included in the content consumption history of the recommendation target user to the content vectors of the consumption content items; and
a recommendation control circuit configured to:
choose at least one first recommended content item among the multiple content items based on a similarity between the user vector of the recommendation target user and the content vector of each of the multiple content items,
choose a subset of the other users similar to the recommended target user by comparing the user vector of the recommendation target user and a user vector of each of the other users, choose at least one second recommended content item among the multiple contents items based on a content consumption history of the subset of the other users; and generate a combined ranked list of recommended content items based on the at least one first recommended content item applied with a first recommendation weight value and the at least one second recommend content item applied with a second recommendation weight value, wherein the first and second recommendation weight values differ between a type of the multiple content items, the combined ranked list presented to the recommendation target user.

2. The content recommendation device of claim 1, wherein a similarity table storing similarities among the content items based on the content vectors of the multiple content items is created, and wherein the recommendation control circuit is configured to search the multiple content items for similar content items based on similarities with the consumption content items by referring to the similarity table, and then choose the first recommended content item based on the similarity between the user vector of the recommendation target user and the content vector of each of the similar content items.

3. A method of operating a content recommendation device, the method comprising:

analyzing, by a processor, a registered meta information and collected review information of each of multiple content items by:

extracting a topic keyword from meta information of a particular content item among the multiple content items based on predetermined topic keywords using a natural language processing technique, extracting an emotional keyword from review information of the particular content item by other users based on several predetermined emotional keywords using the natural language processing technique, the emotional keyword referring to subjective opinions of the other users on the particular content item, the extracted emotional keyword being one of a plurality of emotional keywords assigned to a category of contents to which the particular content belongs, each category of contents assigned with different emotional keywords, the review information separate from the meta information, and assigning keyword weight values based on the extracted the topic keyword and the extracted emotional keyword to create a content vector for each of the multiple content items so that the content vector comprises the keyword weight value corresponding to the extracted topic keyword and the extracted emotional keyword;

checking, by the processor, a content consumption history including consumption content items of a recommendation target user, wherein the content consumption history of the recommendation target user comprises a consumption weight value corresponding to a feedback provided by the recommendation target user on each of the consumption content items;

creating, by the processor, a user vector of the recommendation target user by applying consumption weight values of the consumption content items included in the content consumption history of the recommendation target user to the content vectors of the consumption content items;

choosing, by the processor, at least one first recommended content item from among the multiple content items based on a similarity between the user vector of the recommendation target user and the content vector of each of the multiple content items;

choosing, by the processor, a subset of the other users similar to the recommended target user by comparing the user vector of the recommendation target user and a user vector of each of the other users, choosing, by the processor, at least one second recommended content item among the multiple contents items based on a content consumption history of the subset of the other users; and generating, by the processor, a combined ranked list of recommended content items based on the at least one first recommended content item applied with a first recommendation weight value and the at least one second recommend content item applied with a second recommendation weight value, wherein the first and second recommendation weight values differ between a type of the multiple content items, the combined ranked list presented to the recommendation target user.

4. The method of claim 3, further comprising: creating, by the processor, a similarity table storing similarities among the content items based on the content vectors of the multiple content items, and wherein the choosing the at least one first recommended content item comprises searching the multiple content items for similar content items based on similarities with the consumption content items by referring to the similarity table, and then choosing the first recommended content item based on the similarity between the user vector of the recommendation target user and the content vector of each of the similar content items.

5. A system for content recommendation service, the system comprising:

a content recommendation circuit configured to:

analyze registered meta information and collected review information of each of multiple content items to create content vectors;

check a content consumption history of a recommendation target user, wherein the content consumption history including consumption content items of the recommendation target user comprises a consumption weight value corresponding to a feedback provided by the recommendation target user on each of the consumption content items;

create a user vector of the recommendation target user by applying consumption weight values of the consumption content items included in the content consumption history of the recommendation target user to the content vectors of the consumption content items;

extract a topic keyword from meta information of a particular content item among the multiple content items based on predetermined topic keywords using a natural language processing technique;

extract an emotional keyword from review information of the particular content item made by other users based on predetermined emotional keywords using the natural language processing technique, the emotional keyword referring to subjective opinions of the other users on the particular content item, the extracted emotional keyword being one of a plurality of emotional keywords assigned to a category of contents to which the particular content belongs, each category of contents assigned with different emotional keywords, the review information separate from the meta information;

create a content vector of each of consumption content items in the content consumption history by assigning keyword weight values based on the extracted topic keyword and the extracted emotional keyword;

choose at least one first recommended content item from among the multiple content items based on a similarity between the user vector of the recommendation target user and the content vector of each of the multiple content items;

choose at least one second recommended content item among the multiple contents items based on a content consumption history of a subset of the other users; and generate a combined ranked list of recommended content items based on the at least one first recommended content item applied with a first recommendation weight value and the at least one second recommend content item applied with a second recommendation weight value, wherein the first and second recommendation weight values differ between a type of the multiple content items, the combined ranked list presented to the recommendation target user; and a terminal circuit configured to output information of the combined ranked list of recommended content items by the content recommendation device in response to a content recommendation event.

* * * * *